Patented Nov. 11, 1941

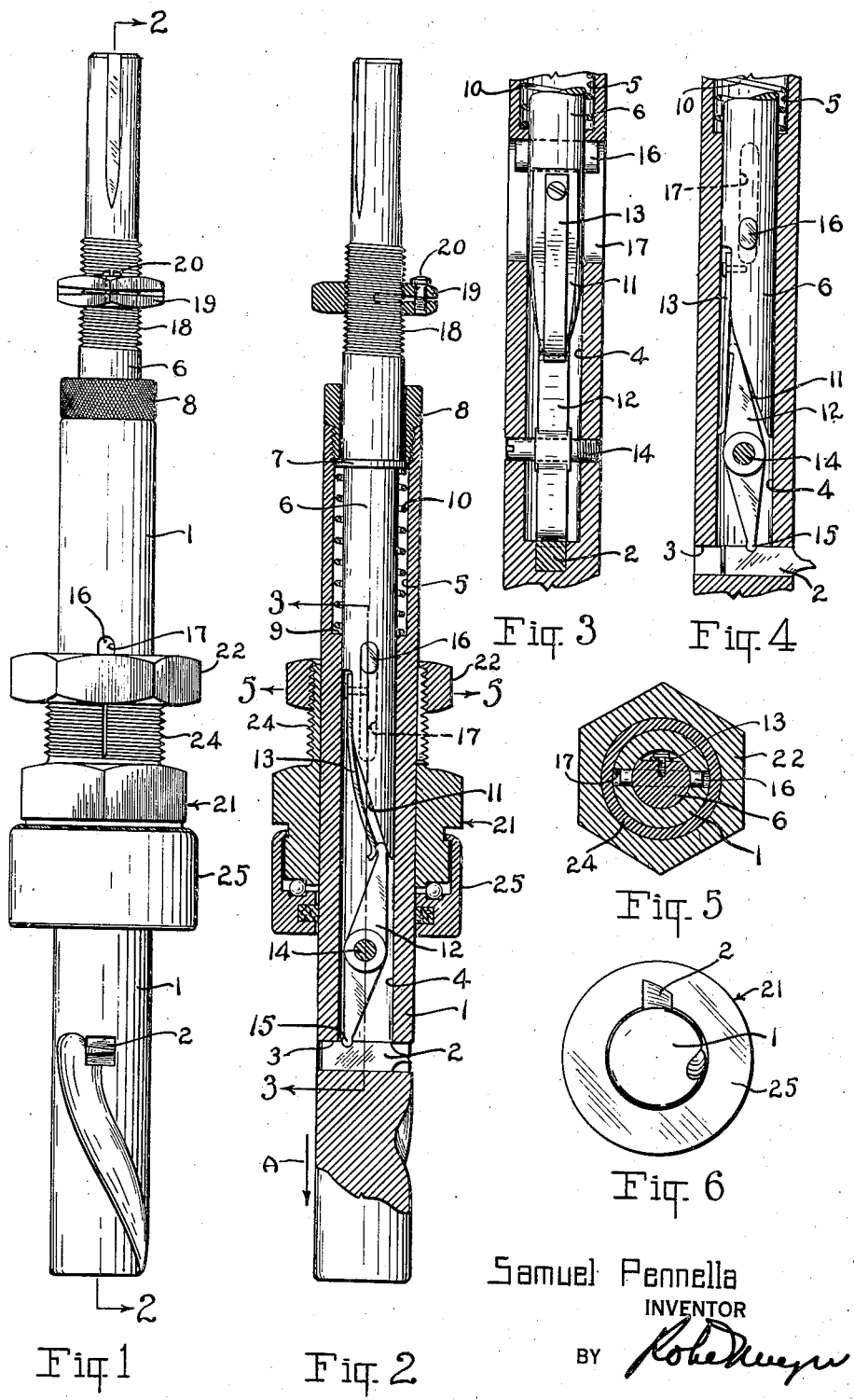

2,262,041

UNITED STATES PATENT OFFICE 2,262,041

TUBE CUTTER

Samuel Pennella, East Orange, N. J.

Application January 7, 1941, Serial No. 373,392

4 Claims. (Cl. 164—0.4)

This invention relates to tube cutter, particularly designed for cutting tubes in surface steam condensers, boilers, heat exchangers, and analogous structures, in which the tubes are arranged in close proximity to each other and in such manner as to make it necessary to employ an internal cutter in lieu of an external cutter.

An object of the present invention is to provide a cutter for cutting the tubes of a surface steam condenser, or like structure, by means of which the tube or tubes may be quickly, easily and accurately cut without removing the tube from the condenser.

Other objects of the present invention are, to provide an internal tube cutter which embodies a spindle for insertion into the tube to be cut, which spindle carries a radially movable cutter or cutting tool; to provide means for gradually advancing the cutter as the spindle is rotated; to provide means for regulating the depth of insertion of the spindle into the tube to be cut; and to provide adjustable means for limiting the radial movement of the cutter, whereby the depth of the cut made may be gauged and controlled, as circumstances require.

With these and other objects in view, as may appear from the accompanying specification, the invention consists of various features of construction and combination of parts, which will be first described in connection with the accompanying drawing, showing a tube cutter of the preferred form, embodying the invention, and the features forming the invention will be specifically pointed out in the claims.

In the drawing:

Figure 1 is a longitudinal elevation of the tube cutter of the present invention.

Figure 2 is a longitudinal section taken on the line 2—2 of Figure 1.

Figure 3 is a longitudinal section taken on the line 3—3 of Figure 2.

Figure 4 is a fragmentary longitudinal section of the tube cutter, similar to the section shown in Figure 2, with the cutter in its fully projected position.

Figure 5 is a cross section taken on the line 5—5 of Figure 2.

Figure 6 is an end elevation of the tube cutter of the present invention, showing its forward end.

Referring more particularly to the drawing, the tube cutter of the present invention embodies the spindle 1, which is inserted into the tube or pipe to be cut. The spindle 1 carries a cutting tool 2, mounted in a transverse bore 3, for movement transversely of the axis of the spindle.

The spindle 1 has a longitudinal bore 4, extending for a portion of its length and enlarged, as shown at 5, at its outer end. This bore 4 merges into or stops at the transverse bore 3 which carries the cutting tool. A shaft 6 is provided, for longitudinal movement within this bore 4. The shaft 6 carries a fixed collar or shoulder 7, formed thereon, which engages a threaded member 8, which latter threadably engages the interior of the enlarged bore 5 at its outer end. This member 8 forms a closure for the outer end of the bore 5 and the shaft 6 extends through this member for longitudinal movement therethrough. A spring 10 is located within this enlarged bore 5, engaging the collar 7 at its one end, and the shoulder 9, formed by the junction of the bore 4 and its enlarged portion 5, at its other end. Pressure of this spring 10 keeps the shaft 6 in a normally extended position, when no pressure in an inward direction is placed thereon.

At its inner end the push rod or shaft 6 is truncated, at an angle, to form the inclined surface 11. One end of the operating lever 12 is maintained in constant sliding contact with this inclined surface 11, by means of a flat spring 13, attached to the shaft 6 in any suitable manner and bearing against the operating lever. The operating lever 12 is pivoted upon a pin 14, which extends across the bore 4 and through its walls, being threaded at one end to keep it in place, as clearly shown in Figure 3.

The end of the operating lever 12 opposite that which engages the inclined surface 11 carries a ball socket joint 15 for engagement with the cutting tool 2.

When the push rod or shaft 6 is pushed inwardly, in the direction of the arrow A, in opposition to the pressure of the spring 10, the operating lever 12 is rocked, causing the cutting tool 2 to be projected beyond the circumference of the spindle 1, cutting a groove in the tube or pipe to be severed.

The push rod or shaft 6 carries a removable pin 16, the ends of which extend beyond the circumference of the shaft 6 and slide within elongated slots 17, limiting the extremes of longitudinal movement of the shaft 6.

The outer end of the shaft 6 is threaded for a portion of its length, as shown at 18, and a split nut 19 is threaded thereon, which may be locked in adjusted position by means of a tap screw 20. This split nut 19 limits the inward movement of the shaft 6, in turn regulating the resultant pivotal movement of the operating lever 12, and finally in the outward projection of the cutting tool 2. In this way the depth of the groove cut by the cutting tool may be accurately gauged or controlled, through adjustment of the position of the nut 19.

Figure 4 shows the tube cutter with the shaft 6 pushed inwardly to the limit allowed by the nut 19 (as positioned in Figures 1 and 2), at which position the cutting tool 2 is extended to the limit of its projection.

After the cutting tool is inserted into the tube or pipe, the entire tool is rotated, for cutting the kerf or severing the tube, and at the same time pressure is placed upon the shaft 6, causing the cutting tool to extend or project gradually as the pressure is increased, for cutting action. When the cutting operation is completed, the pressure on the shaft 6 is removed, causing the retraction of the cutting tool, by means of the outward pressure of the spring 10 upon the shaft 6 and its consequent movement in an outward direction.

The distance of insertion of the tool into the pipe or tube is limited and regulated by adjustment of the stop structure, comprising a clamping nut 22 which threadably engages the split portion 24 of the stop structure 21. A rotatably mounted abutment 25 engages the end of the tube or pipe to be cut, limiting the insertion of the spindle therein.

It will be understood that the invention is not to be limited to the specific construction or arrangement of parts shown, but that they may be widely modified within the invention defined by the claims.

What is claimed is:

1. In a tube cutter, a spindle for insertion into a tube and rotary movement therein, said spindle provided with a diametrically extending cutter receiving opening, a cutting tool in said opening, said spindle provided with a longitudinally extending bore, a lever pivotally mounted in said bore and having one end connected to said cutting tool, a spring pressed plunger longitudinally movable in said bore and having an inclined face engaging said lever for moving the lever and projecting the cutting tool outwardly beyond the circumference of the spindle progressively as the plunger is moved inwardly, means for retracting the cutting tool progressively as the plunger is moved outwardly, adjustable means for limiting the distance of the insertion of the spindle into a tube, and adjustable means for limiting the inward movement of the plunger into the spindle for regulating the projection of the cutting tool outwardly beyond the circumference of the spindle.

2. In a tube cutter, a spindle for insertion into a tube and rotary movement therein, said spindle provided with a diametrically extending cutter receiving opening, a cutting tool in said opening, said spindle provided with a longitudinally extending bore, a lever pivotally mounted in said bore and having one end connected to said cutting tool, a spring pressed plunger longitudinally movable in said bore and having an inclined face engaging said lever for moving the lever and projecting the cutting tool outwardly beyond the circumference of the spindle progressively as the plunger is moved inwardly, means for retracting the cutting tool progressively as the plunger is moved outwardly, adjustable means for limiting the distance of the insertion of the spindle into a tube, adjustable means for limiting the inward movement of the plunger into the spindle for regulating the projection of the cutting tool outwardly beyond the circumference of the spindle, and means carried by said spindle and cooperating with said plunger to provide stops for limiting the maximum inward and outward movement of the plunger in the spindle irrespective of said second-mentioned adjustable means.

3. In a tube cutter, a spindle for insertion into a tube and rotary movement therein, said spindle provided with a diametrically extending cutter receiving opening, a cutting tool in said opening, said spindle provided with a longitudinally extending bore, a lever pivotally mounted in said bore and having one end connected to said cutting tool, a spring pressed plunger longitudinally movable in said bore and having an inclined face engaging said lever for moving the lever and projecting the cutting tool outwardly beyond the circumference of the spindle progressively as the plunger is moved inwardly, means for retracting the cutting tool progressively as the plunger is moved outwardly, and a stop means adjustably carried by said spindle for limiting the insertion of the spindle into a tube, said stop means comprising means for clamping engagement with the spindle and an abutment head rotatably connected to said clamping means.

4. In a tube cutter, a spindle for insertion into a tube and rotary movement therein, said spindle provided with a diametrically extending cutter receiving opening, a cutting tool in said opening, said spindle provided with a longitudinally extending bore, a lever pivotally mounted in said bore and having one end connected to said cutting tool, a spring pressed plunger longitudinally movable in said bore and having an inclined face engaging said lever for moving the lever and projecting the cutting tool outwardly beyond the circumference of the spindle progressively as the plunger is moved inwardly, means for retracting the cutting tool progressively as the plunger is moved outwardly, a stop means adjustably carried by said spindle for limiting the insertion of the spindle into a tube, said stop means comprising means for clamping engagement with the spindle and an abutment head rotatably connected to said clamping means, and means adjustably carried by said plunger for engagement against the end of the spindle for limiting the inward movement of the plunger in the spindle.

SAMUEL PENNELLA.